United States Patent
Oltheten et al.

(10) Patent No.: US 10,697,795 B2
(45) Date of Patent: Jun. 30, 2020

(54) AUTOMATIC HEADING CORRECTION FOR DIRECTIONAL GYROSCOPES

(71) Applicant: Bell Textron Inc., Fort Worth, TX (US)

(72) Inventors: Erik John Oltheten, Fort Worth, TX (US); Aaron Thomas Halverson, Grapevine, TX (US)

(73) Assignee: Bell Textron Inc., Fort Worth, TX (US)

( * ) Notice: Subject to any disclaimer, the term of this patent is extended or adjusted under 35 U.S.C. 154(b) by 118 days.

(21) Appl. No.: 15/894,871

(22) Filed: Feb. 12, 2018

(65) Prior Publication Data

US 2019/0250009 A1 Aug. 15, 2019

(51) Int. Cl.
*G01C 23/00* (2006.01)
*G01S 19/40* (2010.01)
(Continued)

(52) U.S. Cl.
CPC .......... *G01C 23/005* (2013.01); *B64D 43/00* (2013.01); *G01C 21/08* (2013.01); *G01C 21/165* (2013.01);
(Continued)

(58) Field of Classification Search
CPC ............ G01C 19/34–38; G01C 23/005; G01C 25/00–005; G01C 19/00; G01C 21/00; G01C 23/00; G01S 19/00–55
(Continued)

(56) References Cited

U.S. PATENT DOCUMENTS 3,062,048 A * 11/1962 Heaid .................... B64D 45/00
  73/178 R
3,921,305 A * 11/1975 King, Jr. ................ G01C 17/30
  33/317 D
(Continued)

OTHER PUBLICATIONS

TruTrak Flight Systems, Operating Handbook For Gemini Autopilot, Revision B, Aug. 11, 2016 (Year: 2016).*
(Continued)

*Primary Examiner* — Jeffrey C Boomer
*Assistant Examiner* — Paul Allen
(74) *Attorney, Agent, or Firm* — Lawrence Youst PLLC

(57) ABSTRACT

A navigation system for vehicles, such as rotorcraft, includes a directional gyroscope having a magnetic heading correction mode, a nonmagnetic manual heading correction mode and a nonmagnetic automatic heading correction mode. A magnetic field sensor is operably coupled to the directional gyroscope and is operable to generate magnetic north-based signals. A heading correction input is operably coupled to the directional gyroscope and is operable to generate manual signals upon actuation thereof. A global positioning system sensor is operably coupled to the directional gyroscope and is operable to generate track-based signals. In the magnetic heading correction mode, the directional gyroscope receives the magnetic north-based signals for heading corrections. In the nonmagnetic manual heading correction mode, the directional gyroscope receives the manual signals for heading corrections. In the nonmagnetic automatic heading correc-
(Continued)

tion mode, the directional gyroscope periodically receives the track-based signals for heading corrections.

20 Claims, 3 Drawing Sheets

(51) Int. Cl.
| | |
|---|---|
| *G01C 21/08* | (2006.01) |
| *G01C 21/16* | (2006.01) |
| *B64D 43/00* | (2006.01) |
| *G01C 25/00* | (2006.01) |
| *G01C 19/42* | (2006.01) |

(52) U.S. Cl.
CPC ............ *G01C 23/00* (2013.01); *G01C 25/00* (2013.01); *G01S 19/40* (2013.01); *G01C 19/42* (2013.01)

(58) Field of Classification Search
USPC .......................... 73/1.75–1.78; 701/468, 530
See application file for complete search history.

(56) References Cited

U.S. PATENT DOCUMENTS

| | | | | |
|---|---|---|---|---|
| 4,415,879 A * | 11/1983 | Brady | ............. | G01C 23/00 |
| | | | | 340/909 |
| 4,419,832 A * | 12/1983 | Schmidt | ............. | G01C 19/32 |
| | | | | 33/329 |
| 4,879,542 A * | 11/1989 | Elsey | ............. | B60K 28/066 |
| | | | | 340/326 |
| 6,631,321 B1 * | 10/2003 | Ciprian | ............. | G01C 21/12 |
| | | | | 340/988 |
| 8,065,074 B1 * | 11/2011 | Liccardo | ............. | G01C 21/165 |
| | | | | 701/480 |
| 8,275,544 B1 | 9/2012 | Wells et al. | | |
| 9,377,780 B1 * | 6/2016 | Arbuckle | ............. | G05D 1/00 |
| 9,383,756 B2 | 7/2016 | Certain | | |
| 9,573,675 B2 | 2/2017 | Salesse-Lavergne | | |
| 9,682,768 B2 | 6/2017 | Salesse-Lavergne | | |
| 9,789,953 B2 | 10/2017 | Salesse-Lavergne | | |
| 9,868,513 B2 | 1/2018 | Sandri | | |
| 2002/0021245 A1 * | 2/2002 | Lin | ............. | G01S 19/53 |
| | | | | 342/357.32 |
| 2006/0038718 A1 * | 2/2006 | Arakane | ............. | G01C 21/165 |
| | | | | 342/357.32 |
| 2009/0138143 A1 * | 5/2009 | Ferreira | ............. | G01C 21/16 |
| | | | | 701/4 |
| 2009/0140885 A1 * | 6/2009 | Rogers | ............. | G01C 5/005 |
| | | | | 340/977 |
| 2011/0184594 A1 * | 7/2011 | Manfred | ............. | G01C 21/165 |
| | | | | 701/14 |
| 2016/0252354 A1 | 9/2016 | Georgy et al. | | |
| 2016/0304028 A1 * | 10/2016 | Hathaway | ............. | B60Q 9/008 |
| 2017/0131107 A1 * | 5/2017 | Kondoh | ............. | G01C 19/00 |
| 2019/0079199 A1 * | 3/2019 | Tu | ............. | G01S 19/45 |

OTHER PUBLICATIONS

Honeywell Bendix/King Automatic Flight Control System, Pilot's Guide, KFC 225, Revision 1, Sep. 2004 (Year: 2004).*
H. M. Witherow and A. Hansen, "Electrically driven gyroscopes for aircraft," in Electrical Engineering, vol. 63, No. 4, pp. 204-208, Apr. 1944. doi: 10.1109/EE.1944.6440242 (Year: 1944).*
Honeywell Bendix/King Pilot's Guide for the KFC 150/KAP & KAP 100 Flight Control Systems, 1998 (Year: 1998).*
TruTrak Flight Systems, Operating Handbook for Digiflight II Series Autopilots, Nov. 2007 (Year: 2007).*
European Search Report; Application No. 19150118.8; European Patent Office; dated Jul. 19, 2019.
European Exam Report; Application No. 19150118.8; European Patent Office; dated Jul. 31, 2019.

* cited by examiner

AUTOMATIC HEADING CORRECTION FOR DIRECTIONAL GYROSCOPES

TECHNICAL FIELD OF THE DISCLOSURE

The present disclosure relates, in general, to heading corrections for directional gyroscopes for navigation near earth's magnetic north pole and, in particular, to a navigation system operable to use track-based signals for automatic heading corrections of a directional gyroscope operating in a nonmagnetic mode.

BACKGROUND

Aircraft typically navigate by means of magnetic heading using a directional gyroscope that is synchronized with or slaved to a magnetic field sensor that detects the earth's magnetic field. The magnetic field sensor provides magnetic north-based signals that are used to eliminate the effects of gyro drift caused by unbalance, friction, the rotation of the earth or other phenomena. It has been found, however, that in the vicinity of the earth's magnetic poles, the magnetic reference generated by the magnetic field sensor becomes unreliable and not suitably stable to provide navigation cues. In fact, in the area designated as Canadian Northern Domestic Airspace (CDNA), aircraft are required to navigate using a true north reference instead of the magnetic reference. For many larger aircraft, this is accomplished using a gyrocompass or an inertial reference system (IRS). For smaller aircraft, however, these systems are typically too costly to be deployed. Instead, many smaller aircraft obtain the true north reference by disengaging the directional gyroscope from the magnetic field sensor, resulting in an unslaved or free directional gyroscope, then manually preforming heading corrections in accordance with visual and/or other navigation references. It has been found, however, that due to gyro drift, a free directional gyroscope must be manually corrected periodically to maintain the desired heading. As the manual corrections must typically take place on the order of every five to ten minutes, this creates a significant workload burden on the pilot.

SUMMARY

In a first aspect, the present disclosure is directed to a navigation system for a vehicle, such as a rotorcraft. The navigation system includes a directional gyroscope having a magnetic heading correction mode, a nonmagnetic manual heading correction mode and a nonmagnetic automatic heading correction mode. A magnetic field sensor is operably coupled to the directional gyroscope and is operable to generate magnetic north-based signals. A heading correction input is operably coupled to the directional gyroscope and is operable to generate manual signals upon actuation thereof. A global positioning system sensor is operably coupled to the directional gyroscope and is operable to generate track-based signals. In the magnetic heading correction mode, the directional gyroscope receives the magnetic north-based signals from the magnetic field sensor for heading corrections. In the nonmagnetic manual heading correction mode, the directional gyroscope receives the manual signals from the heading correction input for heading corrections. In the nonmagnetic automatic heading correction mode, the directional gyroscope receives the track-based signals from the global positioning system sensor for heading corrections.

In some embodiments, a speed processor may be operably coupled to the directional gyroscope. The speed processor is operable to determine whether the vehicle speed exceeds a predetermined speed threshold and operable to transition the directional gyroscope between the nonmagnetic manual heading correction mode and the nonmagnetic automatic heading correction mode. For example, the speed processor may transition the directional gyroscope from the nonmagnetic manual heading correction mode to the nonmagnetic automatic heading correction mode when the vehicle speed exceeds the predetermined speed threshold. Also, the speed processor may transition the directional gyroscope from the nonmagnetic automatic heading correction mode to the nonmagnetic manual heading correction mode when the vehicle speed falls below the predetermined speed threshold. In certain embodiments, the predetermined speed threshold may be between about 10 knots and about 30 knots. In some embodiments, a navigation display may be operably coupled to the directional gyroscope and operable to indicate a heading of the vehicle. In certain embodiments, in the nonmagnetic automatic heading correction mode, the directional gyroscope periodically receives the track-based signals from the global positioning system sensor to automatically perform heading corrections such as once per minute.

In a second aspect, the present disclosure is directed to a method of navigating a vehicle having a directional gyroscope with a magnetic heading correction mode, a nonmagnetic manual heading correction mode and a nonmagnetic automatic heading correction mode. The method includes receiving magnetic north-based signals from a magnetic field sensor for heading corrections by the directional gyroscope when the directional gyroscope is in the magnetic heading correction mode; receiving manual signals responsive to actuation of a heading correction input for heading corrections by the directional gyroscope when the directional gyroscope is in the nonmagnetic manual heading correction mode; and receiving track-based signals from a global positioning system sensor for heading corrections by the directional gyroscope when the directional gyroscope is in the nonmagnetic automatic heading correction mode.

The method may also include transitioning the directional gyroscope between the nonmagnetic manual heading correction mode and the nonmagnetic automatic heading correction mode responsive to vehicle speed; transitioning the directional gyroscope from the nonmagnetic manual heading correction mode to the nonmagnetic automatic heading correction mode responsive to the vehicle speed exceeding a predetermined speed threshold; transitioning the directional gyroscope from the nonmagnetic automatic heading correction mode to the nonmagnetic manual heading correction mode responsive to the vehicle speed falling below the predetermined speed threshold; providing periodic alerts to perform the manual heading corrections when the directional gyroscope is in the nonmagnetic manual heading correction mode; receiving periodic track-based signals from the global positioning system sensor to automatically perform heading corrections in the nonmagnetic automatic heading correction mode and/or indicating a heading of the vehicle on a navigation display.

In a third aspect, the present disclosure is directed to an aircraft that includes a directional gyroscope having a magnetic heading correction mode, a nonmagnetic manual heading correction mode and a nonmagnetic automatic heading correction mode. A navigation display is operably coupled to the directional gyroscope and is operable to indicate a heading of the aircraft. A magnetic field sensor is operably coupled to the directional gyroscope and is operable to generate magnetic north-based signals. A heading correction input is operably coupled to the directional gyroscope and is operable to generate manual signals upon actuation thereof. A global positioning system sensor is operably coupled to the directional gyroscope and is operable to generate track-based signals. In the magnetic heading correction mode, the directional gyroscope receives the magnetic north-based signals from the magnetic field sensor for heading corrections. In the nonmagnetic manual heading correction mode, the directional gyroscope receives the manual signals from the heading correction input for heading corrections. In the nonmagnetic automatic heading correction mode, the directional gyroscope receives the track-based signals from the global positioning system sensor for heading corrections.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and nonmoving mechanical connections.

Figure 1A:
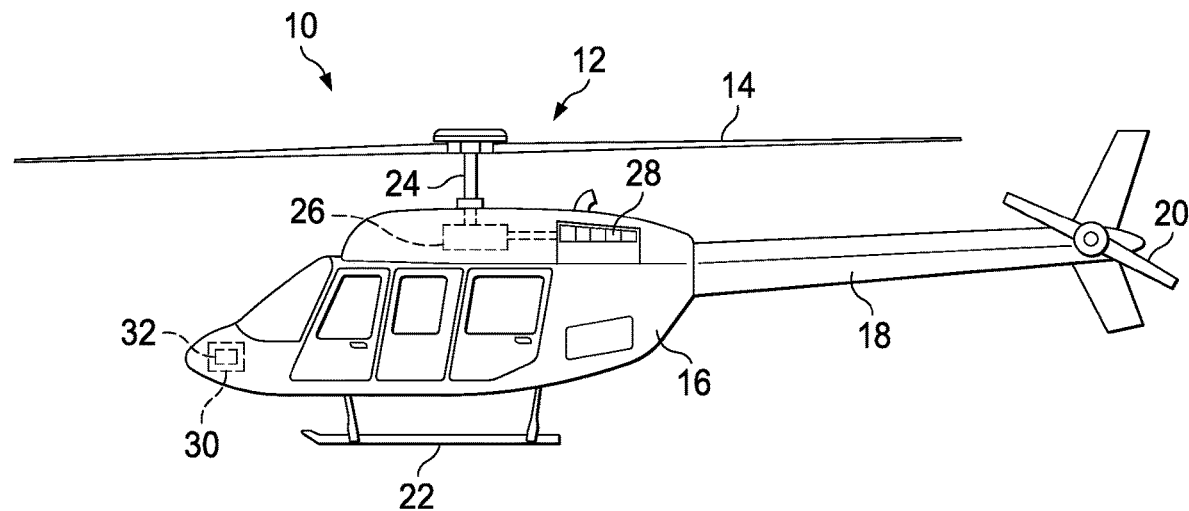
FIGS. 1A-1B are schematic illustrations of an exemplary rotorcraft having a navigation system including a directional gyroscope with a nonmagnetic automatic heading correction mode in accordance with embodiments of the present disclosure.
Figure 1B:
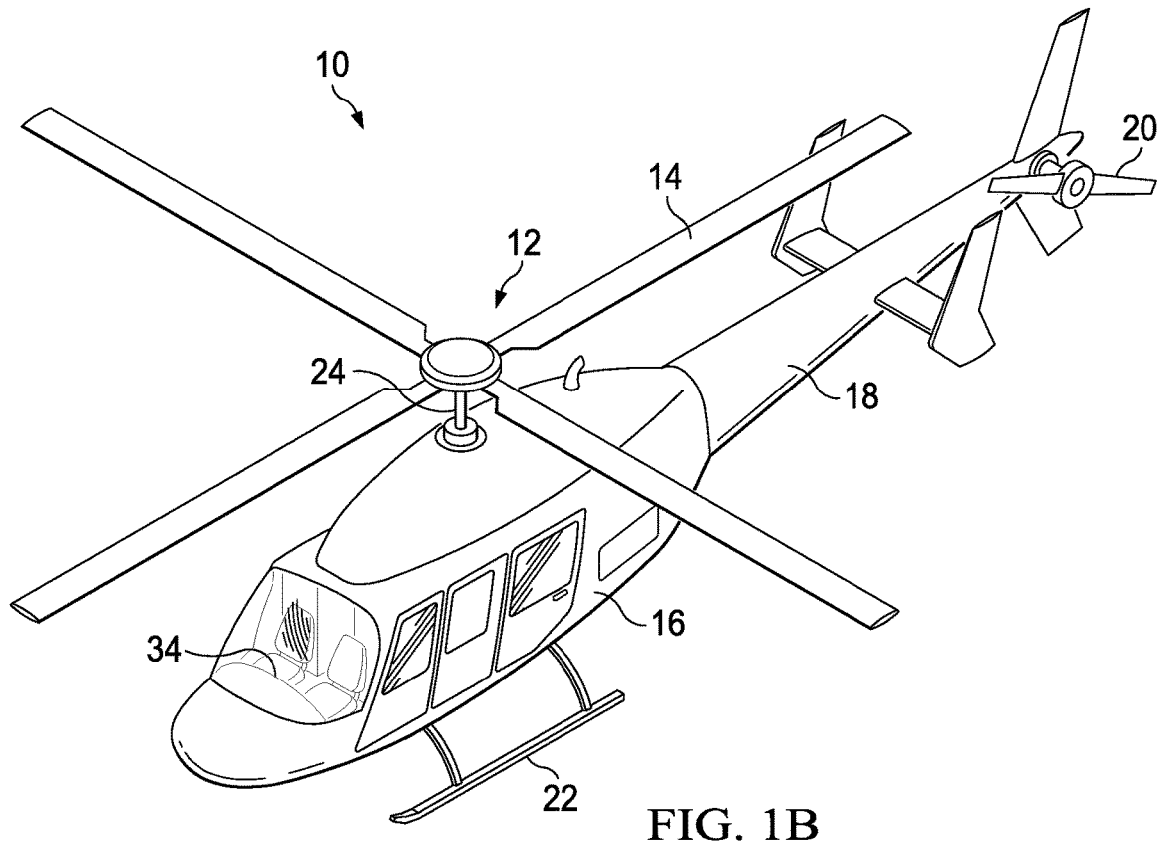

Referring now to FIGS. 1A-1B in the drawings, a rotorcraft depicted as helicopter 10 is schematically illustrated. Helicopter 10 has a main rotor 12 with a plurality of rotor blades 14. The pitch of rotor blades 14 can be collectively manipulated using a collective pitch control lever and cyclically manipulated using a cyclic pitch control stick to selectively control direction, thrust and lift of helicopter 10. Helicopter 10 includes a body depicted as fuselage 16 and tailboom 18. Helicopter 10 also includes an anti-torque system depicted as tail rotor 20 that is controlled by anti-torque pedals. Helicopter 10 has a landing gear system 22 to provide ground support for the aircraft. Main rotor 12 is supported atop helicopter 10 by a mast 24, which connects main rotor 12 to a main gearbox 26. Main gearbox 26 includes a plurality of gears that are mechanically coupled to one or more engines 28 that provide torque and rotational energy to main gearbox 26. Main gearbox 26 includes a transmission that is used to adjust the engine output to a suitable rotational speed so that engines 28 and main rotor 12 may rotate at optimum speeds during flight.

Helicopter 10 has a flight control computer 30. In the illustrated embodiment, helicopter 10 includes a navigation system 32 that may be independent of and/or a part of flight control computer 30. Navigation system 32 includes one or more heading systems such as an attitude heading reference system (AHRS) that may utilize micro-electromechanical system (MEMS) sensors or other suitable sensors. The attitude and heading reference system may include a vertical gyroscope, a turn rate gyroscope and a directional gyroscope. Helicopter 10 includes an instrument and display panel 34 that may have a plurality of analog gauges and/or digital displays that provide the pilot with information about the flight situation of helicopter 10. For example, panel 34 may include an altimeter, an airspeed indicator, a vertical speed indicator, a dual tachometer, a magnetic compass, an attitude indicator, a heading indicator and the like. The attitude indicator and the heading indicator form at least a part of the navigation display of helicopter 10. The attitude indicator and the heading indicator preferably receive information from the attitude and heading reference system. Panel 34 also includes a plurality of inputs such as buttons, dials, knobs and hard switches as well as soft switches in embodiments of helicopter 10 having touch screen displays. In the illustrated embodiment, helicopter 10 includes a heading correction input, such as a knob or toggle switch that is actuatable by the pilot to supply manual signals to slew the compass card of the directional gyroscope for heading corrections, which are displayed on the heading indicator. The attitude and heading reference system may receive information or signals from a variety of internal or external sources or aides including a magnetic field sensor, such as a 3-axis solid state magnetometer, and a global positioning system sensor. Depending upon the mode of operation of the directional gyroscope, the attitude and heading reference system uses magnetic north-based signals from the magnetic field sensor or true track-based signals from the global positioning system sensor to apply heading corrections to the directional gyroscope.

Figure 2:
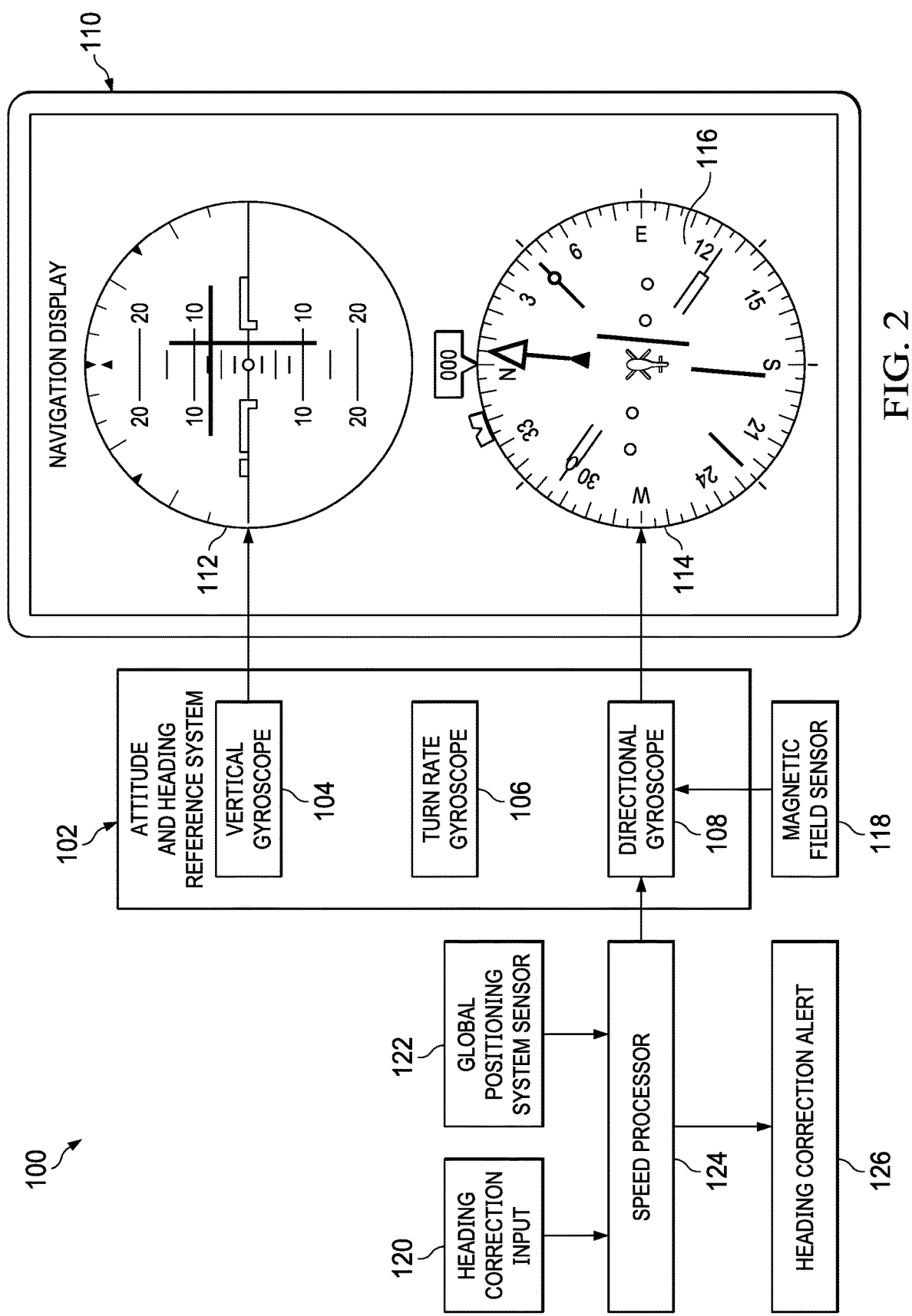
FIG. 2 is a systems diagram of a navigation system including a directional gyroscope with a nonmagnetic automatic heading correction mode in accordance with embodiments of the present disclosure.

Referring now to FIG. 2, therein is depicted a systems diagram of a navigation system for helicopter 10 that is generally designated 100. In the illustrated embodiment, navigation system 100 includes a heading system depicted as an attitude and heading reference system 102. In the illustrated embodiment, attitude and heading reference system 102 includes a vertical gyroscope 104, a turn rate gyroscope 106 and a directional gyroscope 108. Vertical gyroscope 104 is used to determine the true vertical direction and the horizon plane, as well as angles of inclination relative thereto. In embodiments, vertical gyroscope 104 rotates about a vertical axis and is mounted within a gimbal having two degrees of freedom. Vertical gyroscope 104 output signals based upon the angular displacements about the two orthogonal axes of the gimbal. Vertical gyroscope 104 provides signals to measure both bank angle and pitch attitude of helicopter 10. Turn rate gyroscope 106 is used to determine the rate of turn or the rate of change in the heading of helicopter 10. In embodiments, turn rate gyroscope 106 is a gyroscope mounted in a gimbal with a rotational axis in-line with the pitch axis of helicopter 10 and with the gimbal having a degree of freedom around the roll axis of helicopter 10. Turn rate gyroscope 106 operates on the principle of precession such that when helicopter 10 yaws, a torque force is applied to the gyroscope around the vertical axis causing precession around the roll axis. Directional gyroscope 108 is used to determine the heading of helicopter 10. In embodiments, directional gyroscope 108 rotates in a vertical plane and is oriented in space in a constant direction. Directional gyroscope 108 operates based upon the principle of rigidity in space wherein helicopter 10 revolves around the vertical axis of the gyroscope as the gyroscope holds its fixed position in space.

Navigation system 100 includes a navigation display 110 that provides the pilot of helicopter 10 with information about the flight situation of helicopter 10. In the illustrated embodiment, navigation display 110 includes an attitude indicator 112 and a heading indicator 114 including a compass card 116. Attitude indicator 112 provides the pilot of helicopter 10 with information regarding the attitude of helicopter 10 including whether the rotorcraft is climbing, descending, turning, straight and/or level as well as a direct indication of changes to pitch attitude and bank. Attitude indicator 112 consists of an artificial horizon that may be depicted as a white line above which the sky may be depicted in blue and below which the ground may be depicted in brown forming a background on which a symbolic aircraft is displayed. For example, in the illustrated embodiment, the symbolic aircraft is positioned on the artificial horizon indicating helicopter 10 is engaging in level flight. Heading indicator 114 provides the pilot of helicopter 10 with directional information to aid in navigation. For example, as helicopter 10 turns left or right, heading indicator 114 changes to depict the new heading on the scale of compass card 116 between zero and 359 degrees on the vertical dial. In some embodiments, compass card 116 is a mechanical component of directional gyroscope 108 such that when helicopter 10 revolves around the vertical axis of the gyroscope, linkages within directional gyroscope 108 rotate compass card 116 a corresponding amount. In other embodiments, compass card 116 may be a digital display that rotates responsive to signals generated by directional gyroscope 108.

Due to phenomena such as unbalance, friction and the rotation of the earth, directional gyroscope 108 is subject to gyro drift that may result in directional gyroscope 108 accumulating errors and thus not providing the correct heading information. Directional gyroscope 108 has three modes of operation for receiving heading correction information. Specifically, directional gyroscope 108 has a magnetic heading correction mode, a nonmagnetic manual heading correction mode and a nonmagnetic automatic heading correction mode. When operating helicopter 10 sufficiently distant from the earth's magnetic poles, directional gyroscope 108 may be operated in the magnetic heading correction mode wherein directional gyroscope 108 receives magnetic north-based signals from a magnetic field sensor 118 on a periodic or continuous basis. This operation effectively synchronizes directional gyroscope 108 with the magnetic compass of helicopter 10 by rotating compass card 116 relative to the other components of directional gyroscope 108, thereby providing heading corrections for directional gyroscope 108 to overcome gyro drift.

In the vicinity of the earth's magnetic poles, however, the magnetic reference generated by magnetic field sensor 118 becomes unreliable. As a result, in the regions such as the Canadian Northern Domestic Airspace (CDNA), aircraft are required to navigate using a true north reference instead of the magnetic reference. In such regions, helicopter 10 operates directional gyroscope 108 in one of its nonmagnetic modes. In the nonmagnetic manual heading correction mode, directional gyroscope 108 receives manual signals that are generated responsive to pilot actuation of a heading correction input 120 such as a knob or toggle switch on the instrument and display panel of rotorcraft 10. In this mode, the pilot uses visual and/or other true north navigation references while actuating heading correction input 120 to generate manual signals that slew compass card 116 relative to the other components of directional gyroscope 108, thereby providing heading corrections for directional gyroscope 108 to overcome gyro drift. Due to the continual nature of gyro drift, however, this manual process creates a significant workload burden for the pilot as directional gyroscope 108 may require heading corrections on the order of every five to ten minutes.

This workload burden is overcome in helicopter 10 through the use of navigation system 100 when directional gyroscope 108 is operating in the nonmagnetic automatic heading correction mode. In this mode, directional gyroscope 108 receives track-based signals from a global positioning system sensor 122 on a continuous or periodic basis such as once per minute. Global positioning system sensor 122 is operable to determine the location of helicopter 10 using signals for a worldwide radio-navigation system formed from a constellation of satellites. Global positioning system sensor 122 uses position tracking, the change in location over time, to generate ground track and/or air track information based upon a true north reference. Global positioning system sensor 122 then provides track-based signals and preferably true track-based signals to directional gyroscope 108 to rotate compass card 116 relative to the other components of directional gyroscope 108, thereby providing heading corrections for directional gyroscope 108 to overcome gyro drift.

The tracking functionality of global positioning system sensor 122 is accurate only when helicopter 10 has a vehicle speed that exceeds the predetermined speed threshold. In embodiments, the predetermined speed threshold for suitable accuracy of global positioning system sensor 122 is between about 10 knots and about 30 knots. Navigation system 100 incorporates a speed processor 124 that monitors the vehicle speed of helicopter 10 to transition directional gyroscope 108 between the nonmagnetic manual heading correction mode and the nonmagnetic automatic heading correction mode. For example, speed processor 124 transitions directional gyroscope 108 from the nonmagnetic manual heading correction mode to the nonmagnetic automatic heading correction mode when the vehicle speed exceeds the predetermined speed threshold. Likewise, speed processor 124 transitions directional gyroscope 108 from the nonmagnetic automatic heading correction mode to the nonmagnetic manual heading correction mode when the vehicle speed falls below the predetermined speed threshold. In addition, when the vehicle speed is below the predetermined speed threshold, speed processor 124 sends signals to a heading correction alert 126 such as an audible or visual annunciator to warn the pilot of helicopter 10 that actuation of heading correction input 120 is required to provide heading corrections for directional gyroscope 108.

In addition, the accuracy of the track-based signals provided by global positioning system sensor 122 to directional gyroscope 108 during the nonmagnetic automatic heading correction mode can be enhanced by incorporating wind data. It is noted that an aircraft's heading will differ from its track by the effect of wind. Thus, wind data that is reported or estimated can be supplied by the pilot and used by, for example, speed processor 124 such that the track-based signals, groundspeed, wind speed and wind direction are used to compute the heading corrections for directional gyroscope 108.

In embodiments of the present disclosure, speed processor 124 may be a general purpose processor, a processor core, a multiprocessor, a reconfigurable processor, a microcontroller, a digital signal processor (DSP), an application specific integrated circuit (ASIC), a controller, a state machine, gated logic, discrete hardware components, any other processing unit, or any combination or multiplicity thereof. The operations of speed processor 124 may take place in a single processing unit, multiple processing units, a single processing core, multiple processing cores, special purpose processing cores, co-processors or any combination thereof. According to certain embodiments, speed processor 124 may be a software based or hardware based virtualized computing machine executing within one or more other computing machines such as flight control computer 30 of helicopter 10.

Figure 3:
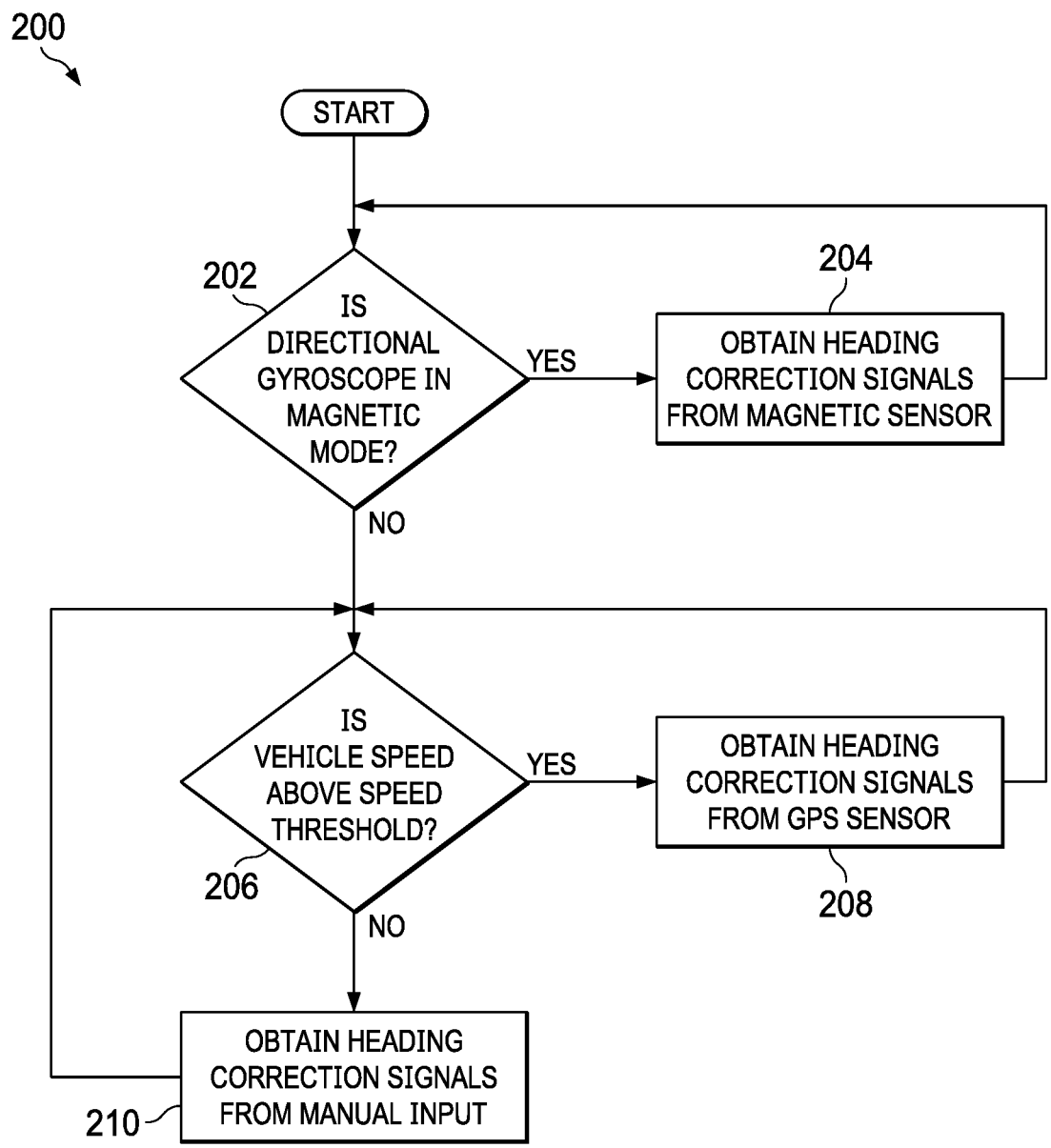
FIG. 3 is a logic diagram of a navigation system including a directional gyroscope with a nonmagnetic automatic heading correction mode in accordance with embodiments of the present disclosure.

Referring additionally to FIG. 3, an algorithm for navigating a vehicle having a directional gyroscope with a magnetic heading correction mode, a nonmagnetic manual heading correction mode and a nonmagnetic automatic heading correction mode will now be discussed with reference to a logic diagram that is generally designated 200. The process starts by determining whether the directional gyroscope is operating in the magnetic heading correction mode in decision 202. If the directional gyroscope is operating in the magnetic heading correction mode, then the directional gyroscope will receives magnetic north-based signals from the magnetic field sensor for heading corrections in block 204. These magnetic north-based signals are used to synchronize the directional gyroscope with the magnetic north reference by rotating the compass card to the corrected magnetic heading. As long as helicopter 10 is operating sufficiently distant from the earth's magnetic poles, this processes repeats on a continuous or periodic basis such as on the order of every ten to fifteen minutes.

If the directional gyroscope is not operating in the magnetic heading correction mode, it is determined whether the vehicle speed of helicopter 10 is above the predetermined speed threshold in decision 206. If the vehicle speed of helicopter 10 is above the predetermined speed threshold as determined by the speed processor, then the directional gyroscope will receives track-based signals from the global positioning system sensor for heading corrections in block 208. These track-based signals are used to synchronize the directional gyroscope based upon the true north reference by rotating the compass card to the corrected true heading. As long as the vehicle speed of helicopter 10 remains above the predetermined speed threshold, this process repeats on a continuous or periodic basis such as on the order of one per minute.

If the vehicle speed of helicopter 10 falls below or is otherwise determined to be below the predetermined speed threshold in decision 206, then the directional gyroscope will receives manual signals that are generated responsive to pilot actuation of the heading correction input for heading corrections in block 210. These manual signals are used to synchronize the directional gyroscope based upon a true north reference by rotating the compass card to the corrected true heading. As long as the vehicle speed of helicopter 10 remains below the predetermined speed threshold, this manual process must be repeated on a periodic basis such as on the order of every five to ten minutes. If the vehicle speed of helicopter 10 rises above the predetermined speed threshold in decision 206, then the directional gyroscope will obtain track-based signals from the global positioning system sensor for heading corrections in block 208.

In this manner, when helicopter 10 is operating in the vicinity of the earth's magnetic poles and has a vehicle speed that exceed a predetermined threshold, directional gyroscope 108 operates in the nonmagnetic automatic heading correction mode wherein directional gyroscope 108 periodically receives track-based signals from global positioning system sensor 122 to automatically perform heading corrections. Embodiments of the navigation system disclosed herein may comprise a computer program that embodies the functions described and illustrated herein, wherein the computer program is implemented in a computer system, such as the flight control computer disclosed herein, that comprises instructions stored in a machine-readable medium and a processor that executes the instructions. However, it should be apparent that there could be many different ways of implementing embodiments in computer programming and the embodiments should not be construed as limited to any one set of computer program instructions. Further, a skilled programmer would be able to write such a computer program to implement the disclosed embodiments based on the appended flow charts, algorithms and associated description herein. Therefore, disclosure of a particular set of program code instructions is not considered necessary for an adequate understanding of how to make and use the disclosed embodiments. Further, those skilled in the art will appreciate that one or more aspects of the embodiments described herein may be performed by hardware, software or a combination thereof. Moreover, any reference to an act being performed by a computer should not be construed as being performed by a single computer as more than one computer may perform the act.

The example embodiments described herein may be used with computer hardware and software that perform the methods and processing functions described previously. The systems, methods and procedures described herein may be embodied in a programmable computer, computer-executable software or digital circuitry. The software may be stored on computer-readable media such as one or more of a floppy disk, RAM, ROM, hard disk, removable media, flash memory, memory stick, optical media, magneto-optical media, CD-ROM and the like. Digital circuitry may include integrated circuits, gate arrays, building block logic, field programmable gate arrays (FPGA) and the like. The example systems, methods and acts described in the embodiments presented previously are illustrative and, in alternative embodiments, certain acts can be performed in a different order, in parallel with one another, omitted entirely and/or combined between different example embodiments and/or certain additional acts can be performed, without departing from the scope and spirit of embodiments disclosed herein. Accordingly, such alternative embodiments are included in the description herein.

As used herein, the term "hardware" may include a combination of discrete components, an integrated circuit, an application-specific integrated circuit, a field programmable gate array or other suitable hardware. As used herein, the term "software" may include one or more objects, agents, threads, lines of code, subroutines, separate software applications, two or more lines of code or other suitable software structures operating in one or more software applications, on one or more processors, wherein a processor may include one or more microcomputers or other suitable data processing units, memory devices, input-output devices, displays, data input devices, peripherals, associated drivers, control cards, power sources, network devices or other suitable devices operating under control of software systems in conjunction with the processor or other devices.

In general, a software system is a system that operates on a processor to perform predetermined functions in response to predetermined data fields. Unless a specific algorithm is disclosed, then any suitable algorithm that would be known to one of skill in the art for performing the function using the associated data fields is contemplated as falling within the scope of the disclosure. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A navigation system for a rotorcraft having a heading and an airspeed, the navigation system comprising:
    a directional gyroscope configured to determine the heading of the rotorcraft during flight by rotating in a vertical plane and being oriented in space in a constant direction, the directional gyroscope having a magnetic heading correction mode, a nonmagnetic manual heading correction mode and a nonmagnetic automatic heading correction mode;
    a magnetic field sensor operably coupled to the directional gyroscope and operable to generate magnetic north-based signals;
    a heading correction input operably coupled to the directional gyroscope and operable to generate manual signals upon actuation thereof; and
    a global positioning system sensor operably coupled to the directional gyroscope and operable to generate track-based signals;
    wherein, in the magnetic heading correction mode, the directional gyroscope receives the magnetic north-based signals from the magnetic field sensor for heading corrections;
    wherein, in the nonmagnetic manual heading correction mode, the directional gyroscope receives the manual signals from the heading correction input for heading corrections;
    wherein, in the nonmagnetic automatic heading correction mode, the directional gyroscope receives the track-based signals from the global positioning system sensor for heading corrections; and
    wherein, when the directional gyroscope is not in the magnetic heading correction mode, the directional gyroscope automatically transitions from the nonmagnetic manual heading correction mode to the nonmagnetic automatic heading correction mode responsive to the airspeed exceeding a predetermined airspeed threshold between 10 knots and 30 knots and automatically transitions from the nonmagnetic automatic heading correction mode to the nonmagnetic manual heading correction mode responsive to the airspeed falling below the predetermined airspeed threshold.

2. The navigation system as recited in claim 1 further comprising a speed processor operably coupled to the directional gyroscope and the speed processor operable to determine whether the airspeed exceeds the predetermined airspeed threshold and operable to transition the directional gyroscope between the nonmagnetic manual heading correction mode and the nonmagnetic automatic heading correction mode.

3. The navigation system as recited in claim 1 further comprising a compass card mechanically linked to the directional gyroscope that indicates the heading of the rotorcraft during flight.

4. The navigation system as recited in claim 1 further comprising a compass card digitally linked to the directional gyroscope that indicates the heading of the rotorcraft during flight.

5. The navigation system as recited in claim 1 further comprising:
    a vertical gyroscope configured to determine a true vertical direction, a horizon plane and angles of inclination relative thereto; and
    a turn rate gyroscope configured to determine a turn rate of the rotorcraft.

6. The navigation system as recited in claim 1 further comprising a navigation display operably coupled to the directional gyroscope and operable to indicate the heading of the rotorcraft during flight.

7. The navigation system as recited in claim 1 wherein, in the nonmagnetic automatic heading correction mode, the directional gyroscope periodically receives the track-based signals from the global positioning system sensor to automatically perform heading corrections.

8. A method of navigating a rotorcraft having a heading and an airspeed, the method comprising:
rotating a directional gyroscope in a vertical plane such that the directional gyroscope is oriented in space in a constant direction to determine the heading of the rotorcraft during flight;
receiving magnetic north-based signals from a magnetic field sensor for heading corrections by the directional gyroscope when the directional gyroscope is in a magnetic heading correction mode;
receiving manual signals responsive to actuation of a heading correction input for heading corrections by the directional gyroscope when the directional gyroscope is in a nonmagnetic manual heading correction mode; and
receiving track-based signals from a global positioning system sensor for heading corrections by the directional gyroscope when the directional gyroscope is in a nonmagnetic automatic heading correction mode;
wherein, when the directional gyroscope is not in the magnetic heading correction mode, automatically transitioning the directional gyroscope from the nonmagnetic manual heading correction mode to the nonmagnetic automatic heading correction mode responsive to the airspeed exceeding a predetermined airspeed threshold between 10 knots and 30 knots and automatically transitioning the directional gyroscope from the nonmagnetic automatic heading correction mode to the nonmagnetic manual heading correction mode responsive to the airspeed falling below the predetermined airspeed threshold.

9. The method as recited in claim 8 further comprising rotating a vertical gyroscope mounted within a gimbal having two degrees of freedom about a vertical axis to determine a true vertical direction, a horizon plane and angles of inclination relative thereto.

10. The method as recited in claim 8 further comprising rotating a turn rate gyroscope mounted in a gimbal with a rotational axis in-line with a pitch axis of the rotorcraft and with the gimbal having a degree of freedom around a roll axis of the rotorcraft to determine a turn rate of the rotorcraft.

11. The method as recited in claim 8 further comprising rotating a compass card linked to the directional gyroscope that indicates the heading of the rotorcraft during flight.

12. The method as recited in claim 8 further comprising providing periodic alerts to perform the manual heading corrections when the directional gyroscope is in the nonmagnetic manual heading correction mode.

13. The method as recited in claim 8 wherein receiving track-based signals from the global positioning system sensor for heading corrections by the directional gyroscope further comprises receiving periodic track-based signals from the global positioning system sensor to automatically perform the heading corrections.

14. The method as recited in claim 8 further comprising indicating the heading of the rotorcraft on a navigation display.

15. A rotorcraft having a heading and an airspeed, the rotorcraft comprising:
a directional gyroscope configured to determine the heading of the rotorcraft during flight by rotating in a vertical plane and being oriented in space in a constant direction, the directional gyroscope having a magnetic heading correction mode, a nonmagnetic manual heading correction mode and a nonmagnetic automatic heading correction mode;
a navigation display operably coupled to the directional gyroscope and operable to indicate the heading of the rotorcraft;
a magnetic field sensor operably coupled to the directional gyroscope and operable to generate magnetic north-based signals;
a heading correction input operably coupled to the directional gyroscope and operable to generate manual signals upon actuation thereof; and
a global positioning system sensor operably coupled to the directional gyroscope and operable to generate track-based signals;
wherein, in the magnetic heading correction mode, the directional gyroscope receives the magnetic north-based signals from the magnetic field sensor for heading corrections;
wherein, in the nonmagnetic manual heading correction mode, the directional gyroscope receives the manual signals from the heading correction input for heading corrections;
wherein, in the nonmagnetic automatic heading correction mode, the directional gyroscope receives the track-based signals from the global positioning system sensor for heading corrections; and
wherein, when the directional gyroscope is not in the magnetic heading correction mode, the directional gyroscope automatically transitions from the nonmagnetic manual heading correction mode to the nonmagnetic automatic heading correction mode responsive to the airspeed exceeding a predetermined airspeed threshold between 10 knots and 30 knots and automatically transitions from the nonmagnetic automatic heading correction mode to the nonmagnetic manual heading correction mode responsive to the airspeed falling below the predetermined airspeed threshold.

16. The rotorcraft as recited in claim 15 further comprising a speed processor operably coupled to the directional gyroscope and the speed processor operable to determine whether the airspeed exceeds the predetermined airspeed threshold and operable to transition the directional gyroscope between the nonmagnetic manual heading correction mode and the nonmagnetic automatic heading correction mode.

17. The rotorcraft as recited in claim 15 further comprising a compass card mechanically linked to the directional gyroscope that indicates the heading of the rotorcraft during flight.

18. The rotorcraft as recited in claim 15 further comprising a compass card digitally linked to the directional gyroscope that indicates the heading of the rotorcraft during flight.

19. The rotorcraft as recited in claim 15 further comprising:
a vertical gyroscope configured to determine a true vertical direction, a horizon plane and angles of inclination relative thereto; and
a turn rate gyroscope configured to determine a turn rate of the rotorcraft.

20. The rotorcraft as recited in claim 15 wherein, in the nonmagnetic automatic heading correction mode, the directional gyroscope periodically receives the track-based signals from the global positioning system sensor to automatically perform heading corrections.

* * * * *